United States Patent [19]

Bowen

[11] 4,365,749
[45] Dec. 28, 1982

[54] CENTER-PIVOT IRRIGATOR

[76] Inventor: Franklin D. Bowen, Rte. #2, Box 104, Terrell, Tex. 75160

[21] Appl. No.: 233,828

[22] Filed: Feb. 12, 1981

Related U.S. Application Data

[63] Continuation of Ser. No. 114,042, Jan. 17, 1980, abandoned.

[51] Int. Cl.³ .............................................. B05B 3/12
[52] U.S. Cl. .................................. 239/177; 239/710; 239/713; 239/716
[58] Field of Search ............... 239/177, 710, 296, 418, 239/398, 423, 428.5, 424, 251, 226, 254, 291, 404, 715, 716, 721, 712

[56]  References Cited
U.S. PATENT DOCUMENTS

| Re. 28,727 | 3/1976 | Rienke | 239/177 |
| 204,695 | 6/1878 | Winebrenner | 239/177 |
| 3,897,000 | 7/1975 | Mandt | 239/177 |

Primary Examiner—James B. Marbert

[57] ABSTRACT

Discloses a center pivot-type sprinkler irrigation system including an elongate rotatable irrigation pipe adapted to be horizontally pivoted at one end with a pipe swivel means connecting a conduit with the irrigation pipe and permitting both vertical pivoting and horizontal swiveling of the irrigation pipe around the conduit. A motor driving means connected between the conduit and the irrigation pipe horizontally rotates the pipe with respect to the conduit. A plurality of support wheels are mounted in spaced apart relation along the pipe to rotate freely around the pipe. A driving mechanism is connected between each support wheel and with the irrigation pipe for driving and rotating each wheel a designated distance along a circular path on the ground with each complete rotation of the irrigation pipe. The designated distance for each respective wheel is selected such that the entire length of the irrigation pipe is pivoted in a substantially straight line around the supply conduit by movement of the wheels. A plurality of novel sprinklers are mounted along and around the irrigation pipe to spray a substantially even ground distribution of water along the length of the pipe as the pipe pivoted around the supply conduit.

10 Claims, 5 Drawing Figures

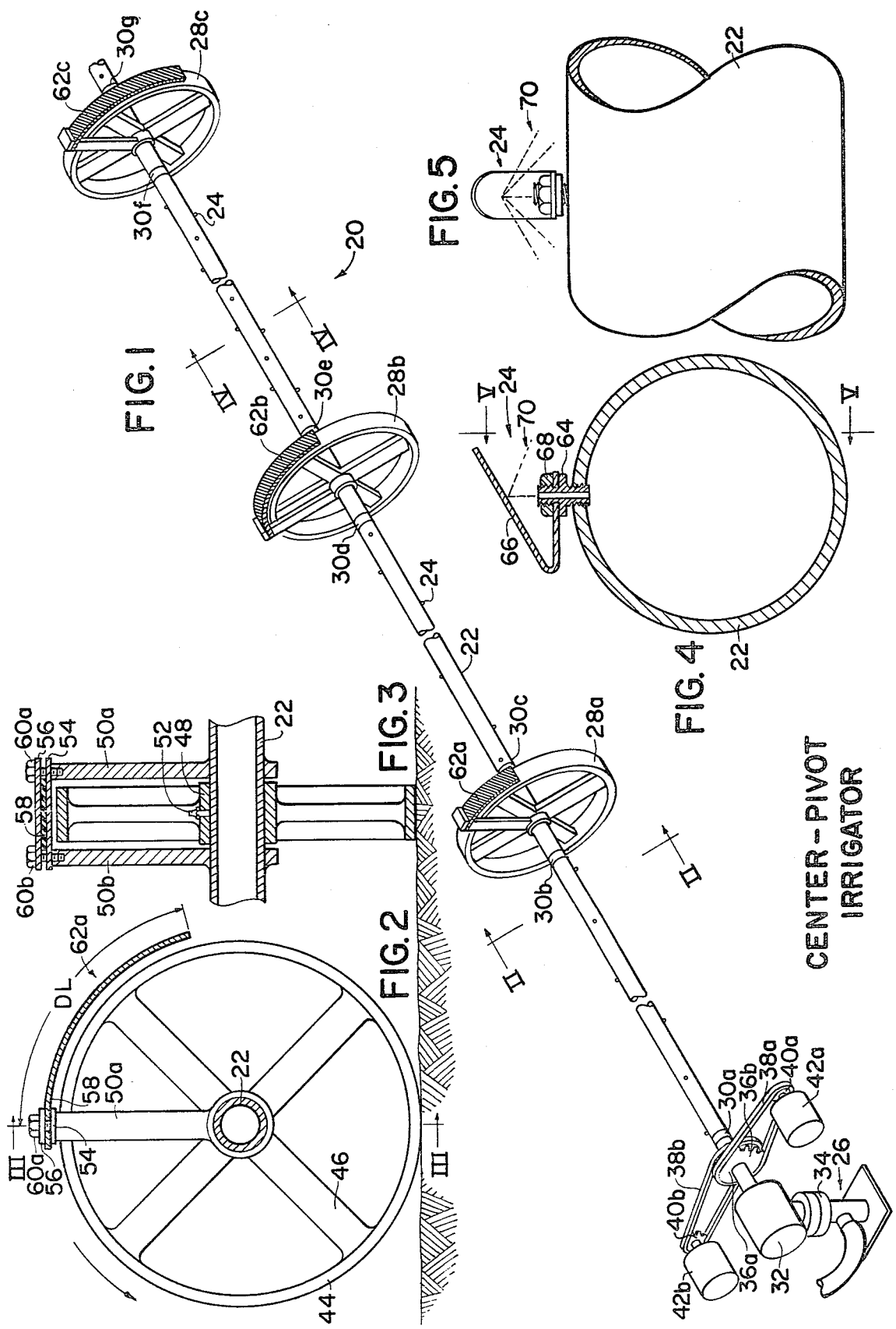

CENTER-PIVOT IRRIGATOR

This application is a continuation of application Ser. No. 114,042, filed Jan. 17, 1980, for Center-Pivot Irrigator, now abandoned.

This invention generally pertains to sprinkler irrigation systems and more particularly pertains to a center-pivot sprinkler system including a length of irrigation pipe supported by plurality of spaced apart wheels to form an elongate structure which is adapted to be evenly driven on the ground around center-pivot by a power source which rotates the pipe from a location at the center-pivot.

BACKGROUND OF THE INVENTION

The present invention differs substantially from presently known and used sprinkler systems. The present invention incorporates an elongate pipe which is driven in rotation both to distribute spray and to intermittently drive spaced apart carrier wheels through a novel wheel engagement linkage. Each single spaced apart carrier wheel provides the sole support for the pipe where such wheel is located. The pipe is provided with spaced apart low pressure splash type sprinkler heads which are mounted to be rotated with the pipe. Such features are not used in the presently known sprinkler systems. The presently known irrigation systems utilize high pressure impact sprinklers mounted upright along pipe which are not rotated and which generally are supported on wheeled carriers of complex design.

OBJECTS OF THE INVENTION

One object of the invention is to provide a pivot sprinkler for agricultural field irrigation which effectively distributes water yet has a low energy requirement.

Another object of the invention is to provide a pivot sprinkler system of simple construction.

Another object of the invention is to provide a driving assembly for the pivoting irrigation pipe which may be of standard design and adjustable at each driving station along the pipe.

A still further object of the invention is to provide a low pressure water jet deflection sprinkler having an impingement surface which defines a fan shaped spray to produce a uniform application of water to the irrigated surface.

SUMMARY OF THE INVENTION

In summary, the forgoing objects are attained with a center pivot-type sprinkler irrigation system including an elongate rotatable irrigation pipe adapted to be horizontally pivoted at one end around a stationary irrigation water supply conduit with a pipe swivel means connecting the conduit with the irrigation pipe and permitting both vertical pivoting and horizontal swiveling of the irrigation pipe around the conduit. A motor driving means is connected between the conduit and the irrigation pipe for horizontally rotating the pipe with respect to the conduit. A plurality of support wheels are each respectively mounted in spaced apart relation along the pipe and journaled to rotate freely around the pipe. A respective driving means is connected with each support wheel and with the irrigation pipe for the irrigation pipe to drive each support wheel only a designated distance along a circular path on the ground with each complete rotation of the irrigation pipe. The designated distance for each respective wheel is selected such that the entire length of the irrigation pipe is moved in a substantially straight line as the pipe is pivoted around the supply conduit by movement of the wheels. A plurality of low pressure water jet deflection surface sprinklers are mounted along and around the irrigation pipe to be rotated with the pipe and adapted to spray a substantially even ground distribution of water along the length of the pipe as the pipe is rotated and thereby pivoted around the supply conduit.

BRIEF DESCRIPTION OF THE DRAWING

FIG. 1 is an isometric schematic side elevational view of the pivoting spray assembly of the present invention;

FIG. 2 is a side elevational view of one of the carrier wheels of the present invention as seen from along the line 2—2 in FIG. 1;

FIG. 3 is a cross sectional elevation of the wheel of FIG. 2 taken along the line 3—3;

FIG. 4 is a cross sectional view of a section of the irrigation pipe taken along the line 4—4 of FIG. 1; and FIG. 5 is a side elevational view of the nozzle of FIG. 4 as taken along the line 5—5 in FIG. 4.

DESCRIPTION OF THE PREFERRED EMBODIMENT

Referring now to FIG. 1, there is shown an isometric view of the sprinkler system 20 of the present invention which includes an elongate irrigation pipe 22 connected in pivoted relation around a central stand pipe or conduit 26. Distributed along the length of irrigation pipe 22 are numerous sprinklers 24 which are mounted to be rotated with the irrigation pipe and mounted in spaced apart relation both around the pipe and along the pipe.

The irrigation pipe 22 is supported along its length, as extending from the stand pipe 30, by a plurality of spaced apart carrier wheels 28a, 28b, 28c, etc., to the end (not shown) of the irrigation pipe 22. Schematically illustrated at 30a, 30i b, 30c, 30d, 30e, and 30f, etc. are a plurality of connecting flanges or other commonly available joints which can transmit torque through the irrigation pipe 22 and which are fluid tight.

The irrigation pipe 22 is connected into a horizontal pipe swivel or journal 32 which is adapted to permit horizontal rotation of the pipe 22 while transmitting water through the swivel from the stand pipe 26.

The pipe swivel 32 is connected into another vertical pipe swivel 34 which is adapted to provide water under pressure into the swivel 32 and permit the swivel 32 to pivot about the axis of the stand pipe 26 to follow the pivoting movement of the irrigation pipe 22.

Mounted with respect to the swivel 32 with suitable mounting brackets (not shown) are driving motors 42a and 42b which may be of the electrical reduction gear type. The driving motors 42a and 42b are respectively equipped with driving chain sprockets 40a and 40b which are respectively connected by means of driving chains 38a and 38b to driven chain sprockets 36a and 36b. Sprockets 36a and 36b are rigidly coupled to the irrigation pipe 22.

As seen, the driving motors 42a and 42b cooperate to drive the irrigation pipe 22 through the driven sprockets 36a and 36b, the driving chains 38a and 38b, and the driving sprockets 40a and 40b.

As shown in FIG. 1, the driving motors 40a and 40b are mounted in generally opposed relation on either side of the irrigation pipe 22. The reason for such opposed mounting is that the tension applied to the driving chains 38a nd 38b to rotate the driven sprockets 36a and 36b is substantially equal and opposed to minimize lateral stress to the bearings (not shown) of the swivel 32.

Referring now to FIG. 2, the carrier wheel 28a is seen to include an outer rim 44 connected through a plurality of radially disposed spokes 46 to a central hub 48. The hub 48 is fitted in journaled relation about a segment of irrigation pipe 22 to permit free rotation of the wheel 28a about the pipe 22.

The central hub 48 is restrained from longitudinal movement along the pipe 22 by driving arms 50a and 50b which are affixed, as by welding, to the shaft 22 on either side of the wheel hub 48.

A lubricator element 52, as shown in FIG. 3, is provided in the central hub 48 to provide for lubrication, as necessary, when rotating the wheel 28a about the pipe 22.

The driving arms 50a and 50b are seen to extend in the same direction to a distance slightly greater than the outer radius of the rim 44. Each of the driving arms is provided with a threaded hole to receive threaded fasteners 60a and 60b respectively. The fasteners are provided to mount a flexible belt section 58 along the outer periphery of the rim 44. The belt section 58 is clamped by fasteners 60a and 60b, as shown in FIGS. 2 and 3, at the ends of the driving arms 50a and 50b between an outer clamp bar 56 and an inner clamp bar 54.

The effective length of the flexible belt section 58 is the length extending from the outer heads of the fasteners 60a and 60b outwardly and around the periphery of the outer rim 44 to its terminal end. The belt section 58 from fasteners 60a and 60b to its end is termed a drive pad or wheel drive pad 62. The effective length of the drive pad 62, shown as DL, is arcutely situated around the periphery of rim 44 as seen in FIGS. 1 and 2.

As seen in FIG. 2, rotation of the irrigation pipe 22 causes movement of drive arms 50a and 50b and the drive pad 62 about the periphery of the rim 44. As the pipe is rotated around, the drive arms are rotated correspondingly and move around the wheel into contact with the ground of the field to be irrigated. When the drive pad 62 reaches the ground, beginning with the fasteners 60a and 60b, further rotation of the pipe 22 will cause the arms to react with the ground and move the pipe 22 in the direction of rotation of the pipe, shown as being to the left in FIG. 2. As the pipe continues to rotate and the arms 60a and 60b continue to move around and under the wheel 28, the drive pad 62 is placed between the rim 44 and the ground and transmits the movement of the drive arms to the drive rim so long as the drive pad remains between the rim 44 and the ground. At such time as the wheel 28 has been rolled to the left a sufficient distance to clear the driving pad from its contact between the wheel and the ground, then the arms are thereafter free to rotate without causing any movement of the wheel 28 until they again reach the ground as previously described.

It is to be seen that the effective length DL of the drive pad 62 governs the distance that the wheel 28 will travel during each respective rotation of the pipe 22.

Referring now to FIG. 1, it is seen that the effective length DL of the drive pads 62, as shown with wheel 28a, 28b, and 28c, are successively longer in proportion to the distance of each wheel away from the point of pivoting from the stand pipe 26.

For the purpose of this explanation, it can be assumed that the irrigation pipe 22 extending from the stand pipe 26 to the outermost carrier wheel 28c comprises the entire irrigation sprinkler pipe assembly of the present invention. It is then seen that the outer wheel 28c may rotate the maximum amount with such maximum amount being proportionate to the length DL of drive pad 62c with one full revolution of pipe 22. Then, the wheel 28b will have its drive pad 62b a proportionally shorter length DL so that wheel 28b will turn a proportionally less distance than does wheel 28c. In turn, the wheel 28a will have its drive pad 62a provided of a still lesser length DL such that wheel 28a will be turned a yet lesser distance in proportion to the movement of wheel 28b.

The arrangement is such that the effective lengths DL of the drive pads 62 on each successive wheel are proportioned such that the irrigation pipe 22 will be maintained in a substantially straight line as it is horizontally pivoted about the stand pipe 26.

The lengths of all the drive pads 62 along the length of the irrigation pipe 22 can be adjusted to give almost any amount of movement through one rotation of the pipe 22. For example, the outer wheel 28c as shown can be adjusted to rotate one half turn during one complete revolution of the pipe 22. Then the wheel 28b could be adjusted to turn one third of a revolution of pipe 22, for example. Consequently, the wheel 28b can be provided to turn one sixth of a turn during an entire revolution of the pipe.

The foregoing proportions can be adjusted to the diameters of the wheels, the spacing along pipe 22 between the wheels, and for a varied number of wheels, all within a reasonable range of the strength in torque of the irrigation pipe 22 and the area of irrigation desired.

As previously described, a large number of the sprinklers 24 are mounted with the irrigation pipe 22 in spaced apart relation along and around the irrigation pipe. As mounted, the sprinklers will rotate around the pipe 22 as the pipe rotates and extend the spray all around the pipe during each revolution of the pipe.

Referring now to FIGS. 4 and 5, each sprinkler 24 is seen to include a nozzle 64 which is mounted into the pipe 22 by threaded connection, for example. A V-shaped splash blade 66 is mounted with nozzle 64 in a position so that the splash blade will present a deflection surface to deflect the low pressure jet of water which will be forced through the nozzle from the inside of the irrigation pipe 22. One arm of the splash blade 66 is drilled to fit over a portion of the jet nozzle 64 and retained into proper position by means of a threaded nut 68. As best seen in FIG. 5, the stream of the water jet passing out of the nozzle 64 impinges on the surface of the splash blade 66 to provide a triangularly spray pattern or fan shaped web of water extending out from the deflection blade 66 and breaking into drops. This fan shaped spray of 70 is parallel to the axis of the spray pipe 22 and to the ground on which the spray is ultimately deposited. As can be seen, the spray is even and regular along its range of spraying through each rotation of the pipe 22.

It is to be noted that very low water pressures are required for efficient irrigation with the use of this invention. The deflection face sprinkler as herein disclosed is inherently capable of producing a spray having good and even water distribution through a large range of water pressures in irrigation pipe 22, including very low pressures in the range of only a few psi. Such efficient low pressure operation of these sprinklers permits equivalent spray irrigation by the present invention (as compared to conventional high pressure sprinkler systems of say 500 gallon per minute capacity with a 100 horsepower requirement) with only about one-fifth of the energy requirement, for example.

OPERATION OF THE DISCLOSED EMBODIMENT

In operation, the irrigation system 20 is assembled in extended relation across an agricultural field and connected to a source of irrigation water under pressure (not shown) at the central stand pipe 26. The drive length DL of the successive drive pads 62 are provided of respective length such that each revolution of the pipe 22 will rotate each wheel 28 a proportionate amount to maintain the length of irrigation pipe 22 in the posture of a substantially straight line from the stand pipe 26 to the outermost wheel as the system 20 is pivoted about the stand pipe. Concurrently, the numerous spaced apart sprinklers 24 evenly distribute irrigation water over the sector of field passed over by the system 20.

It will become apparent to those skilled in the art that numerous revisions and modifications may be made to the embodiment of the invention herein disclosed, all without departing from the spirit of the invention as set forth in the appended claims.

I claim:

1. A method of sprinkler irrigating the ground of a field about a center pivot, comprising:
   (a) horizontally rotating an elongate irrigation pipe by applying torque from said center pivot to said pipe;
   (b) intermittently connecting to said pipe each respective wheel of a plurality of support wheels mounted along the length of said pipe, said wheels being freely rotatable about said pipe when not connected thereto;
   (c) intermittently rolling each said wheel along the ground a respective designated distance through revolutions of said pipe to thereby arcuately move said pipe about said pivot point with the entire structure of said pipe being effectively maintained in elongated posture;
   (d) pumping water under pressure into said irrigation pipe; and
   (e) sprinkling water in substantially even distribution along the length of said pipe from a plurality of sprinklers disposed along said pipe and rotating with said pipe.

2. The method of claim 1 wherein the water from each sprinkler is forced from the pipe as a stream to be deflected from a substantially flat deflection surface into a flat triangular shaped spray.

3. A sprinkler type irrigation system adapted to roll across the ground of a field around a center-pivot, comprising:
   (a) an elongate rotatable irrigation pipe adapted to be horizontally pivoted at one end around the center-pivot of a stationary irrigation water supply conduit;
   (b) pipe swivel means connecting said conduit with said pipe and permitting both vertical pivoting and horizontal swiveling of said pipe around said conduit;
   (c) motor driving means connected to apply torque to said pipe for horizontally rotating said pipe from said pivot with respect to said ground;
   (d) a plurality of support wheels respectively mounted in spaced apart relation along said pipe and journaled to rotate freely around said pipe for supporting said pipe off said ground;
   (e) a respective intermittant driving means connected with each said wheel and with said pipe for intermittantly driving and rotating each said wheel a designated distance along a circular path on said ground in response to rotation of said pipe;
   (f) a designated distance for each respective wheel of said wheels being selected such that the entire structure of said pipe is moved in a substantially elongate posture as said pipe is pivoted around said conduit by movement of said wheels; and
   (g) a plurality of sprinkler means mounted along said pipe and adapted to spray a substantially even ground distribution of water along the length of said pipe as said pipe is rotated and pivoted around.

4. The system of claim 3 wherein said sprinkler means comprises:
   (a) a liquid flow nozzle mounted with said pipe to direct a stream of water extending radially away from the axis of said pipe; and
   (b) a deflection member defining a deflection face across the outlet of said nozzle to deflect the water emitted from said nozzle into a substantially flat triangularly shaped spray extending in parallel relation to the axis of said pipe.

5. The system of claim 3 wherein each said respective driving means is affixed to said pipe and includes means for intermittent connection of said pipe with said support wheel for causing each said support wheel to roll a designated distance along the ground during each revolution of said pipe.

6. The system of claim 3 wherein each said driving means comprises:
   (a) drive arm means extending away from said pipe and affixed to turn with rotation of said pipe; and
   (b) flexible drive belt pad means of designated length connected with the outer ends of said drive arm means to be extended between the outer rim of said support wheel and the ground and to cause rolling of said wheel on said pad means through the length of said pad means on the ground with turning of said arm means.

7. The system of claim 5 wherein each of said sprinkler means comprises nozzle means for directing a liquid stream to form a fan-shaped spray extending in a plane substantially parallel to said pipe.

8. The system of claim 3 wherein each said driving means comprises:
   (a) drive arm means extending away from said pipe and affixed to turn with rotation of said pipe;
   (b) flexible belt drive pad means connected with the outer ends of said drive arm means to be extended between the outer rim of said support wheel and the ground and to cause rolling of said wheel on said pad means through the length of said pad means with turning of said arm means.

9. A center pivot-type sprinkler irrigation system adapted to roll across a surface of ground including an elongate rotatable irrigation pipe, motor driving means connected to said pipe for horizontally rotating said pipe about its axis, a plurality of support wheels respectively mounted in spaced apart relation along said pipe and journaled to rotate freely around said pipe for supporting said pipe from said ground, a respective driving means connected with each said support wheel and with said pipe for driving and rotating each said support wheel a designated distance along a circular path on the ground in response to each complete rotation of said pipe, said respective driving means comprising:
- (a) drive arm means extending away from said pipe and affixed to turn with rotation of said pipe; and
- (b) flexible belt drive pad means of designated length connected with the outer ends of said drive arm means to be extended between the outer rim of said support wheel and the ground and to cause rolling of said wheel on the ground only through the length of said pad means with turning of said arm means.

10. A center pivot-type sprinkler irrigation system adapted to roll across a surface of ground including an elongate rotatable irrigation pipe, motor driving means connected to said pipe for horizontally rotating said pipe, a plurality of support wheels respectively mounted in spaced apart relation along said pipe for supporting said pipe from said ground, driving means connected with each said support wheel and with said pipe for driving and rotating each said support wheel a designated distance along a path on said ground in response to each complete rotation of said pipe, and a plurality of sprinkler means mounted in spaced apart relation along said pipe to produce a spray while rotating with said pipe, each said sprinkler means comprising:
- (a) a liquid flow nozzle mounted with said pipe to direct a stream of water extending radially away from the axis of said pipe; and
- (b) a deflection member defining a deflection face across the outlet of said nozzle to deflect the water emitted from said nozzle into a substantially flat fan-shaped spray extending in parallel relation to the axis of said pipe.

* * * * *